US011958686B2

(12) United States Patent
Turcich

(10) Patent No.: US 11,958,686 B2
(45) Date of Patent: Apr. 16, 2024

(54) BRACES, METHOD AND PROCESS OF USE THEREOF FOR THE REPAIR OF A STORAGE RACK

(71) Applicant: Apex Storage, LLC, West Chicago, IL (US)

(72) Inventor: John Paul Turcich, West Chicago, IL (US)

(73) Assignee: APEX STORAGE, LLC, West Chicago, IL (US)

( * ) Notice: Subject to any disclaimer, the term of this patent is extended or adjusted under 35 U.S.C. 154(b) by 513 days.

(21) Appl. No.: 17/094,021

(22) Filed: Nov. 10, 2020

(65) Prior Publication Data
US 2022/0143764 A1     May 12, 2022

(51) Int. Cl.
*B65G 1/04*     (2006.01)
*B23P 6/04*     (2006.01)

(52) U.S. Cl.
CPC .................. *B65G 1/04* (2013.01); *B23P 6/04* (2013.01); *B65G 2201/0267* (2013.01)

(58) Field of Classification Search
CPC ... A47B 96/00; A47B 96/1441; A47B 47/027; A47B 47/028; A47B 47/0058;
(Continued)

(56) References Cited

U.S. PATENT DOCUMENTS 3,693,309 A * 9/1972 Kutchai ................. E04G 11/48
52/646
6,298,537 B1 * 10/2001 Dion ....................... A47B 96/00
29/402.06
(Continued)

FOREIGN PATENT DOCUMENTS

CA          2711891 A1 *  2/2012   ........... A47B 47/021
WO   WO-2009067990 A1 *  6/2009   ............. A47B 96/00

OTHER PUBLICATIONS

Pallet Rack Repair Kits, Mac Rak, <https://macrak.com/pallet-rack-repair/>, retrieved from internet Jan. 9, 2023, 21 pages.
(Continued)

*Primary Examiner* — Eret C McNichols
(74) *Attorney, Agent, or Firm* — Duane Morris LLP

(57) ABSTRACT

The present disclosure relates to a new method, system, and process for the repair and management of repair of a rack system. More specifically the present disclosure relates to using braces of standard sizes, pre-Certified or not, as part of a new method, and process for the onsite repair of slightly damaged elements of wholesale or storage rack systems and associated process of qualification and certification thereof. Shaped repair braces, designed to be mechanically superior to damaged pieces they replace, allow for the off-site pre-certification, off-site selection, and installation of these braces with a possibility of automatic or semi-automatic recertification of the repaired rack system when the brace is added. The process also allows for the use of one or a set of pre-certified braces and under a controlled process of determination of which brace can be used (using a software or not) and resulting in pre-certification of the system once the brace is successfully put in place.

20 Claims, 14 Drawing Sheets

(58) Field of Classification Search
CPC ... B21D 1/00; B21D 1/14; B21D 1/06; B21D 1/10; B65G 1/04; B65G 2201/0267; B23P 6/04
See application file for complete search history.

(56) References Cited

U.S. PATENT DOCUMENTS

| | | | |
|---|---|---|---|
| 6,332,549 B1 * | 12/2001 | MacDonald | A47B 47/027 211/183 |
| 6,405,884 B1 * | 6/2002 | Dion | A47B 47/02 211/183 |
| 6,557,712 B2 * | 5/2003 | Gruber | A47B 47/027 211/189 |
| D490,678 S * | 6/2004 | Dion | E04G 11/48 D8/381 |
| 7,337,516 B2 * | 3/2008 | Gruber | A47B 47/027 29/401.1 |
| 10,646,035 B1 * | 5/2020 | Schindehette | A47B 47/028 |
| 10,807,845 B2 * | 10/2020 | Weber | B60D 1/665 |
| 10,974,352 B1 * | 4/2021 | Klinger | B23P 19/041 |
| 11,071,398 B2 * | 7/2021 | Hicks | A47F 7/08 |
| 11,691,229 B2 * | 7/2023 | Klinger | B23P 6/00 211/183 |
| 2004/0079718 A1 * | 4/2004 | Gagne | A47B 91/00 211/189 |
| 2008/0173603 A1 * | 7/2008 | Dion | A47B 47/028 211/182 |
| 2010/0163506 A1 * | 7/2010 | Clarke | A47B 47/027 211/183 |
| 2011/0278251 A1 * | 11/2011 | Smith | B65G 1/02 211/183 |
| 2020/0165064 A1 * | 5/2020 | Harrison | B65G 1/02 |
| 2021/0252650 A1 * | 8/2021 | Klinger | B65G 1/00 |

OTHER PUBLICATIONS

Pallet Rack Repair, Worldwide Material Handling, <https://www.wwmh.net/pallet-rack-repair/kits/>, retrieved from internet Jan. 9, 2023, 5 pages.
Pallet Rack Safety Solutions, Damotech, <https://www.damotech.com/>, retrieved from internet Jan. 9, 2023, 11 pages.
Rack Repair Kids, got-rack.com, <https://got-rack.com/rack-repair-kits/>, retrieved from internet Jan. 9, 2023, 7 pages.

* cited by examiner

BRACES, METHOD AND PROCESS OF USE THEREOF FOR THE REPAIR OF A STORAGE RACK

FIELD OF TECHNOLOGY

The present disclosure relates to a new method, system, and process for the repair and management of repair of a rack system. More specifically using braces or components of standard sizes, pre-Certified or not, as part of a new method, and process for the onsite repair of damaged portions of a storage rack system or other related storage racks and associated process of installation, repair, qualification and certification thereof.

BACKGROUND

This technology, relates generally to techniques, processes, methods, and digital-related technologies linked with the field of using and creating large metal structures for the temporary storage, management and retrieval of goods often in bulk quantities and in open spaces. Such spaces includes warehouses, stores, or any other area where goods must be stored upon reception in large quantities for use in a manufacturing process or sales at retail or wholesale.

A pallet rack systems 1 (PRS) as shown at FIG. 1 can be made of a mesh of vertical, horizontal, and orthogonal struts, often metal profiled pieces installed in many different arrangements and connected to each other in ways designed to create a PRS 1 each with slightly different functionalities and properties. One simple and common version shown at FIG. 1, the rack systems 1 is mostly made of vertical (e.g. axis Z as shown 10 at FIG. 1), horizontal (e.g. axis X as shown 10 at FIG. 10), and cross bars (e.g. axis Y as shown 10 at FIG. 1). As shown at FIG. 1, on this basic structure are can be added when appropriate rollers, supports, and other attachment means and protections to create stronger structures with different functionalities and allow for simpler access, management and use of stored goods.

The most famous use known to the general public of what is shown at FIG. 1 is a system in public display in the nation's leading retail wholesaler Costco®. The entire shopping surface where customers walk is made of racks 1 between long corridors wide enough to allow fork lifts or other moving equipment to move free for resupply. Each row is flanked on each side with open structures able to store three or four pallets high as shown at FIG. 1. In the famous wholesaler example, on the floor, a pallet of goods is often unwrapped from its protection and opened for consumers for access. Above it, on the beams and rack openings are stored more pallets of the same food items allowing the wholesaler to simply circulate goods top to bottom. During the day, if a product is sold out on the ground level, a fork lift can simply ride in, take a pallet above and move it down to resupply. At night, a fork lift will refill open spots to the top. These systems optimize costs to consumers as they bypass the expensive process of "shelving" in most retail environments with employees constantly resupplying goods in shelves requiring opening and disposal of packaging.

But most people ignore that variations of such racking systems are very common and critical to the U.S. manufacturing processes. The U.S. economy relies heavily on this technology and how such PRS 1 operates smoothly. With a few exceptions, all manufacturers, industrial plants including for example warehouses need one or more of these structures to operate any industrial processes. These systems are often installed at the arriving area of a plant for storage of raw materials purchased. Depending on the process or the plant configuration, a second rack system 1 can be used for storage at mid-process or to store the finished/processed products. A third rack system 1 can be used in connection with the shipping area where finished/manufactured goods from the facility are wrapped and stored on pallets for delivery via trucks and trains.

At the moment, such systems are built new in a manufacturing, warehouse or plant locations. Over time, as these systems 1 are used, they get damaged by the movement of pallets by heavy lifting equipment. Even the best driver once in a while will strike or touch a piece of these systems. In addition to periodic certification processes, once portions are visibly damaged, at some point, the engineer or the facility/plant/warehouse maintenance manager calls in an expert from the supply corporation and asks for advice. In the most catastrophic situations, such contact results in the collapse of the rack and damage in product, property or life. In most cases, the damage is not as important and the structure can be repaired. As one knows, failure to simply and cheaply repair these systems, or obligations to fully unload these systems will result in decisions to buy or install entire new systems instead of initiating a repair of portions that may be damaged.

In addition, when a single piece or a handful of pieces are removed and replaced, often the owner will insist on a certification that the change has not weakened the overall rack system or created incompatibility or weakness which has voided the manufacturer and installer warranty. After all, failure of these systems can result in loss of human life. Removing pieces also requires the removal of all goods from the system 1 and the disassembly of the structure from the top down. Such re-certifications may require load testing and setting up sensors and gages as the entire system is not able to be used. In some cost-prohibitive cases, recertification can be possible if the structure (material) is plentiful enough, samples can be taken to a lab for destructive testing. What is needed is a system, method and process designed to improve the entire process linked with the repair of these structures.

General Description of Storage Rack Systems

This entire industry is very complex but the inventor offer general guidelines to understand for a potential jury this field and its terminology. Described generally, the entire system once assembled and in place can be named a "Pallet Rack System" (PRS) 1 with four different variations shown at FIGS. 1-4. Another alternative name is the Automated Storage and Retrieval System (ASRS). The term pallet stems from the name of the wooden flat piece of wood placed under the goods with openings for the transport of goods. One of ordinary skill in the art will know that bins, large boxes, or other containers or systems can be used as the "pallet" as part of the invention and these systems.

Such structures include rack components are made generally of struts, and other general accessories for these assembled rack components. The PRS 1 components can include an upright frame beam 2 often called simply "uprights." Those are vertical metal bars or C-sections with different profile shapes each with attach points every couple of inches on one or more of the sides. Using a X-Y-Z Cartesian model 10 to describe as shown at FIG. 1, these Uprights 2 are orientated along one axis, let us say the Z-axis 10 as shown at FIG. 1. Horizontal beams 3, located in the Y-axis as shown at 10 can be bolted or slid into place by one of many locking mechanisms between to help form a X-Y-Z metal structure of the PRS 1. Together, the Uprights and the horizontal beams form vertical flat structural "walls." Often, the PRS 1 and its Horizontal and Upright beams 2, 3, (Z and X) are made of roll-formed metal with teardrop beam connectors and locking mechanisms. This industry of these storage systems is very varied and above is generally described systems covering both structural and roll formed material-based systems. While one type is generally described, one of ordinary skill in the art will understand the wide range of technology that may be used interchangeably.

As part of the use of PRS 1, some systems are manual (as shown at FIG. 1) while others are fully or partly automated. Many are filled and emptied by what is commonly called a "lift truck" with a human driver or some level of floor automation. These lift trucks move using forks a base located under goods in the X-Y-Z space of the PRS 1 to allow for management of the goods. Often, the PRS 1 includes Pallet Rest beams 4 aka Shelf beams along axis X, where all three elements 2, 3, and 4, now form a structure X, Y, and Z. The top surface of the beams 4 defines a lower position for placing the goods called often the "pallet rack bay" in which the goods as shown as 5. As shown, often stored over a "pallet" are slid in by the operator of the lift truck using the forklifts. On FIG. 1, what is also shown are non-palletized goods 6 requiring additional support accessories creating a continuous shelf.

As described, the structure X-Y-Z created is often made of structural steel, hot rolled and rolled formed steam metal. One of the advantage of metal over other materials for forming these structures is its natural capacity to be highly resistant yet have some level of ductility which allows assembly via some level of bending, and the capacity of the structure to take some level of punishment and force and remain functional. Metal, when passed a point of strain will deform but can retain some level of function which will allow the system to have "weak spot" but will not immediately need to be replaced each time a single portion is damaged because the RPS 1 has been over built (e.g. able to take 2× the maximum design load). Design and building codes all require safety factors that increase the theoretical capacity of the members above the actual loads imparted in practice. This is to cover as much of the unknowns and variables imparted from manufacturing process, variability in raw material, general use, as well as end user perception. For example beams with over a L/180 deflection can still safely carry the required loads but the amount of deflection would cause concern to the general use just due to the appearance. Similar with floors in modules (or a house) too much bounce has a perception of lower capacity.

In addition, safety as a whole is critical for these systems. A falling rack system could, for example cause serious property damage and even pull the entire building where it is located down. Often, they will store very heavy loads and videos have shown the disastrous consequences of failure of these structures often high above a person's head. For example, hundreds of tons can be stored on these systems and in case of failure, a domino effect may result in catastrophic harm and destruction of the goods being stored in the system at great peril to human life. Any repair system, process or method must also take into consideration the capability to manage this situation.

The PRS 1 also can include back stops 7, which are horizontal bars along axis X or other structures as shown at FIG. 1 to hold the back of a pallet rack bay to prevent falls or even some type of netting to also catch any goods which would fall. Row spacers 8 can be used to help connect back to back rows of the system as shown at FIG. 1. In some cases, damage protection systems also can be included, often at ground level 9 or at the level where the lift truck moves to help protect the above XYZ system 1. For example, one piece is called a row end protector 9, another a rub rail, and the other a column guard 11 used as a V-shape to protect the anchored feet of the Upright Frame Beams 2. The pallet rack bay, formed or orthogonal beams also can include wire decking on top of the pallet rest or other secondary beams. Pallet supports also are often used in the Y axis below the pallet rest beams 4 in case a wooden pallet or a plastic pallet moves. Finally, in some design instances, some foot plates can be added to the base of the upright frame beams 2 to give greater stability. These plates can be anchored into concrete to add stability and increase the weight bearing of the beams 2.

Added to the above structure elements are hundreds of electronic, automated, digital systems. One of ordinary skill in this art will understand that while only a handful of general principles are described above, the inventor invents a system and repaid process and brace able to be used in all of the above technology and incorporates herein by association all of the information found at the Rack Manufacturing Institute (RMI®) website.

RMI® Codes & Regulations

As in any industry, the PRS 1 as built operate in compliance with OSHA safety regulation and the RMI® design guidelines and certification requirements. RMI® code is also included as a reference in the IBC® building codes across the United States. These standards found on the website of the RMI® include twenty-six different standards incorporated herein by reference and include, for example, ANSI® ECMA15-2018 titled Specification for Cable-less Controls for Electric Overhead Traveling Cranes, ANSI® ICWM-2012 titled Performance Standard for Casters & Wheels, AMSI® MH1-2016 titled Pallet, Slip Sheets, & Other Bases for Unit Loads, ANSI® MH10.8.1-2005, titled Linear Bar Code & 2-Dimensional Symbols, ANSI® MH10.8.12-2011, titled Specification for Material Handling Components, ANSI® MH16.1-2012 titled Specification for the Design, Testing and Utilization of Industrial Steel Storage Racks, ANSI® MH16.3, titled Design, Testing and Utilization of Industrial Steel Cantilever Storage Racks, ANSI® MH26.2-2007, titled Design, Testing and Utilization of Welded-Wire Rack Decking, ANSI® MH28.2-2018, titled Design, Testing and Utilization of Industrial Boltless Steel Shelving, ANSI® MH28.3-2018, titled, Design, Testing and Utilization of Industrial Steel Work Platforms, ANSI® MH30.3-2015, titled, Performance and Testing of Vehicle Restraining Devices, and ANSI® MH32.1-2018, titled, Stairs, Ladders, and Open-Edge Guards for Use with Material Handling Structures. All of the above are incorporated by reference as part of this disclosure.

These numerous standards are critical, for example for engineering service corporations like Zeizmic Inc. (Zeizmic™) a supplier of services and certifications for the material handling industry. These offer engineering, permit management, fabrication, preliminary analysis, structural testing, and inspection services. These inspection services includes mandatory inspection programs set forth by RMI® which includes safety inspections to evaluate structural integrity of installed equipment, conformity inspections to ensure compliance with government and safety standards, damage assessment to examine systems for deficiencies and damages caused by fork truck impacts, overloaded systems or natural disasters, and structural observations to ensure that any system has been installed per the local building codes and the manufacturers specifications. Most of these services, for the moment are costly, manual and require live inspection and provide simple non-automated reports to industry standards. As part of this industry, standards are given that must be met both by a new system being built or by any system in use or after repair. One of ordinary skill in the art of certification and repair of these systems understands that Certification must be given when the system, as repaired, meets the ANSI® requirements and not some portion of these standards.

Variance in Types of Systems

In this field, there are hundreds of different types of systems each designed to offer slightly different functionalities. FIG. 1 is the most simple type of PRS 1 with flat and stacked product bays defined on each side of aisles 3-4 high. Pallets on these basic systems are stored one deep and as shown can be back-to-back with a second access alley. Another (not shown) is known as "push back" where instead of storing one deep and opening multiple alleys, a system allows for storage of 3-6 in a line using a slightly angled rail (i.e. 1 to 5 deg). Pallets are loaded last in—first out the same way products are sold in vending machines. A fork lift operator places a pallet in front and gently pushes it back moving forward. A bar can be located in the front.

FIG. 2 shows a third type of PRS 1 for more than 3-6 pallets (up to 10-15) is called Drive-In Storage Systems and could also be up to two deep. In this configuration, no Pallet beam 4 is used which allows for lift trucks to drive into a long and deep structure with several adjacent rows. Overhead beams tie the system together. These often use boxed columns to limit the damage by using a cantilevered upright beam. It also includes a drive in rail in altitude on which the level 2 or 3 pallets are slid. Finally, as shown at FIG. 3 is one other type of PRS 1 is called the "pallet flow storage" which is a first-in, first-out environment where loading of a slightly inclined sliding rail is done from the back. Pallet guides can be added and speed controllers to avoid escalation or damage and stops at the front. These often will be optimal for volumetric products to be loaded into transport trucks.

As shown at FIG. 4, some of these systems can be made to be automated, like the warehousing system invented by Mr. Zollinger and described in U.S. Pat. No. 3,880,299. Mobile vertical lifts are attached to the system and move in X, Y, and Z to load pallets in bins. Descendants of these are the types of automated PRS 1 now used by large retailers and their warehouses like Amazon.com®.

The key problem is that these systems can easily be damaged and where this happens, they can lose overall integrity and a loss of effective charging load. While these systems are built in redundant ways to allow for some level of damage (e.g. one warped leg) with time heavy weights might cause failure. To repair one single element in this X, Y, Z PRS 1 system, pieces must be cut and removed and this requires the removal of all load on top of the structure and the closure of operation of the entire warehousing system. What is needed is an improved system, method, and process where owners of such PRS 1 can, at lower cost and greater time efficiency properly safely repair and maintain these systems.

The above technology and invention is designed to help remain and manage the repair of all PRS-types and all other related systems. What is described below is shown in relationship with certain embodiments as the inventor's first mode is linked with certain PRS-types and not others. But one of ordinary skill with understand that the above described invention can be extrapolated to any support system.

SUMMARY

The present disclosure relates to a new method, system, and process for the repair and management of repair of a rack system. More specifically the present disclosure relates to using braces of standard sizes, pre-Certified or not, as part of a new method, and process for the onsite repair of slightly damaged elements of wholesale or storage rack systems and associated process of qualification and certification thereof. Shaped repair braces, designed to be mechanically superior to damaged pieces they replace, allow for the off-site pre-certification, off-site selection, and installation of these braces with a possibility of automatic or semi-automatic recertification of the repaired rack system when the brace is added. The process also allows for the use of one or a set of pre-certified braces and under a controlled process of determination of which brace can be used (using a software or not) and resulting in pre-certification of the system once the brace is successfully put in place.

DRAWINGS

The drawings described herein are for illustrative purposes only of selected embodiments and not all possible implementations, and are not intended to limit the scope of the present disclosure.

FIG. 6A is a sample illustration of the software described via diagram at FIG. 5 showing the rack location of a piece of damage according to an embodiment of the present disclosure.

FIG. 6B is a sample illustration of the software described via diagram at FIG. 5 showing the leg style entry of a piece of damage according to an embodiment of the present disclosure.

FIG. 6H-1 are more sample illustration of the software described via diagram at FIG. 5 showing entry of additional data according to an embodiment of the present disclosure.

Corresponding reference numerals indicate corresponding parts throughout the several views of the drawings.

DETAILED DESCRIPTION

Figure 1:
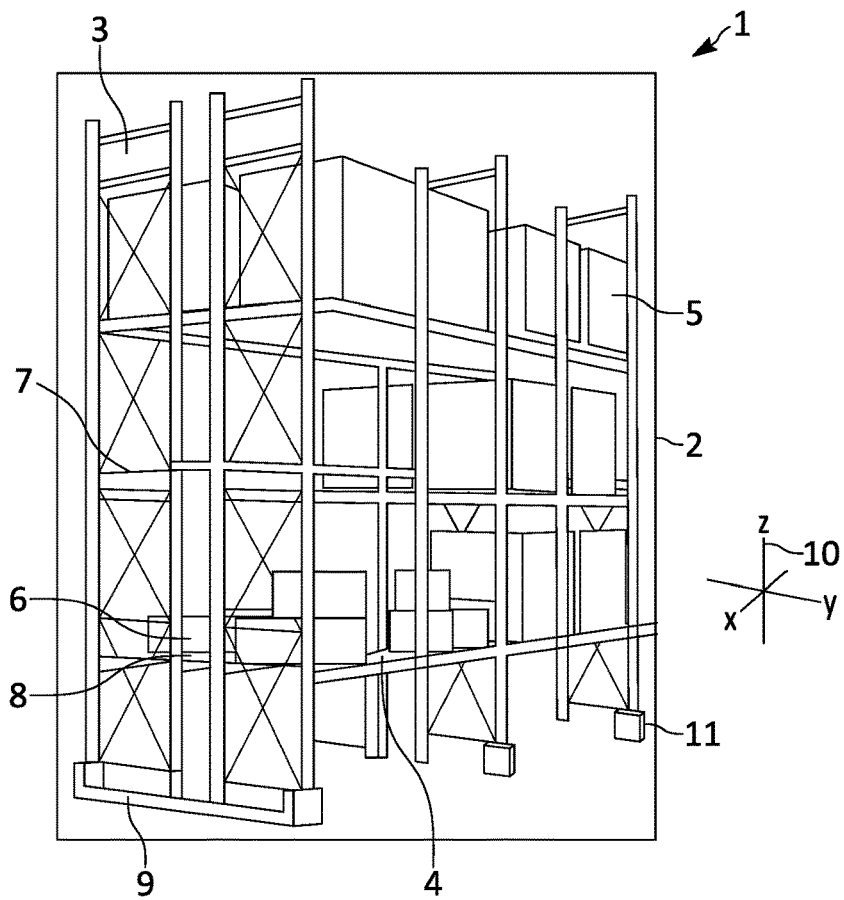
FIG. 1 is an illustration of a first type of rack system.
Figure 4:
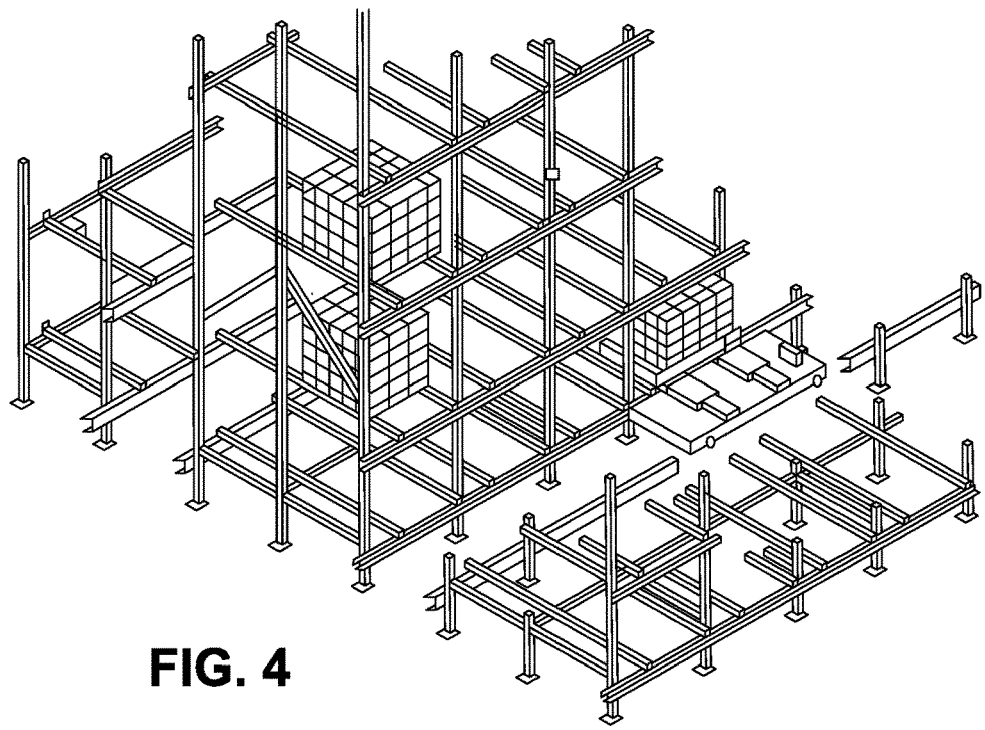
FIG. 4 is an illustration of a fourth type of rack system
Figure 2:
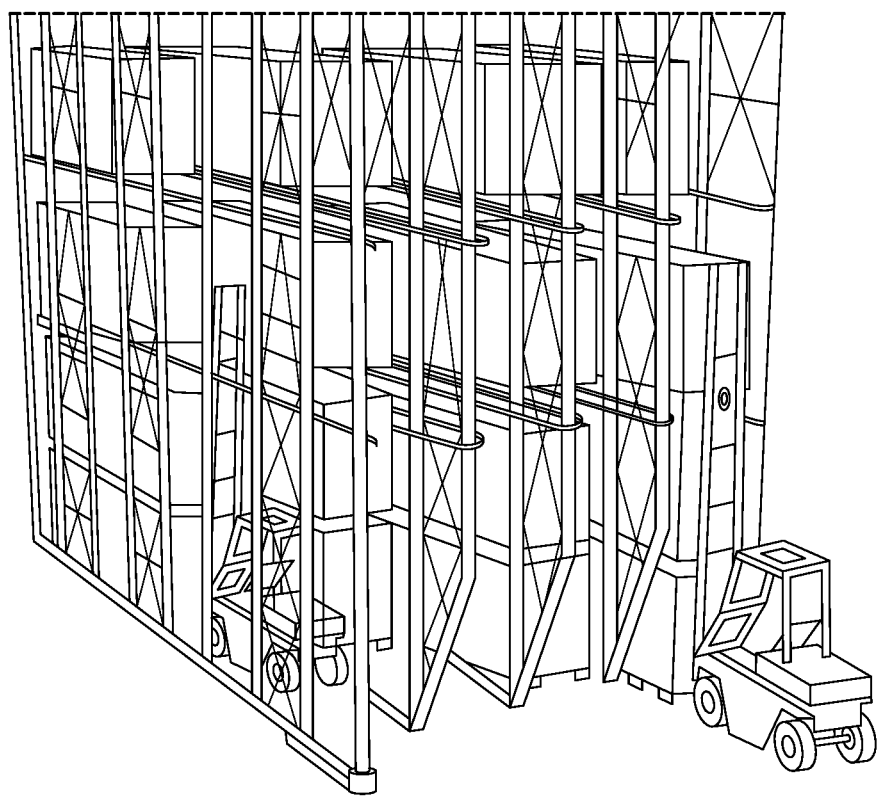
FIG. 2 is an illustration of a second type of rack system.
Figure 3:
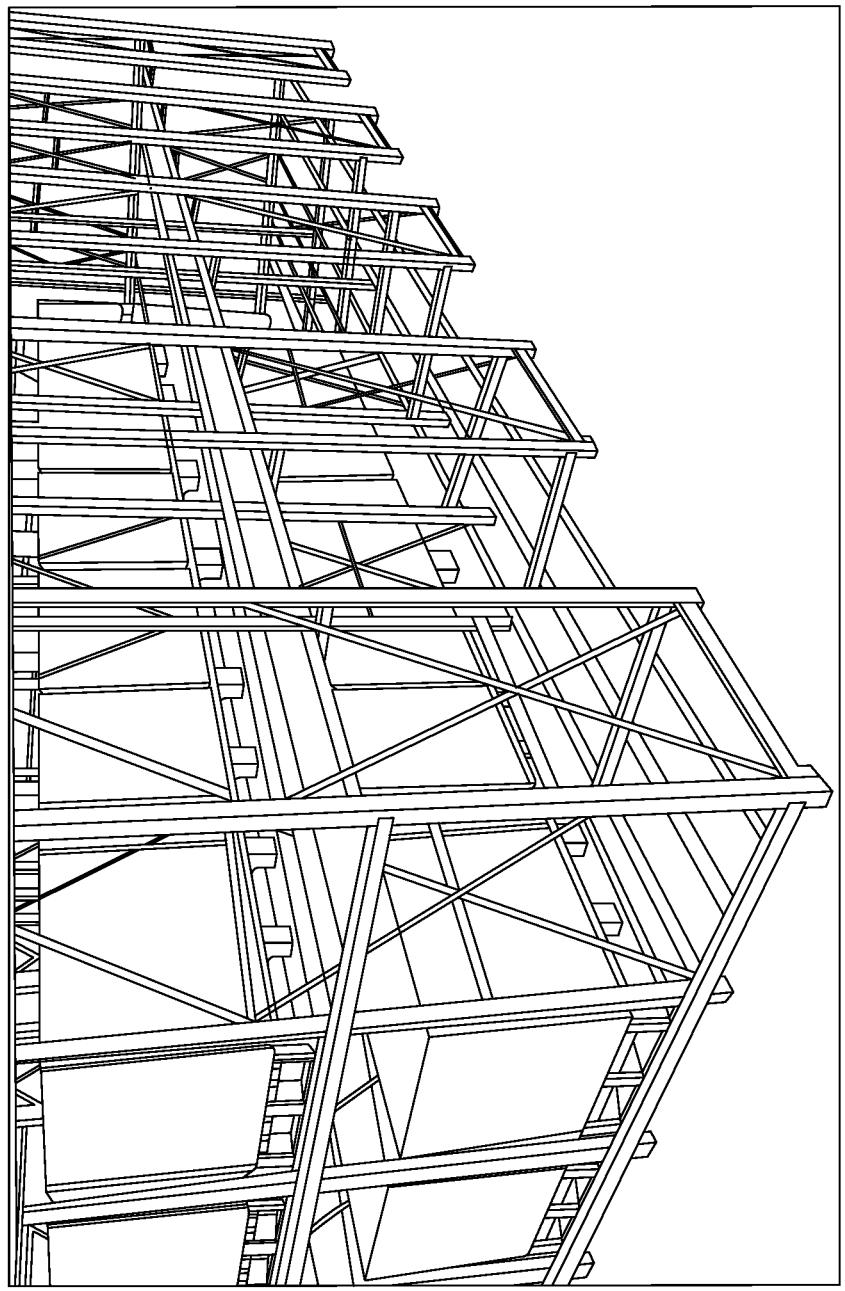
FIG. 3 is an illustration of a third type of rack system.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Use of Braces

Figure 9A:
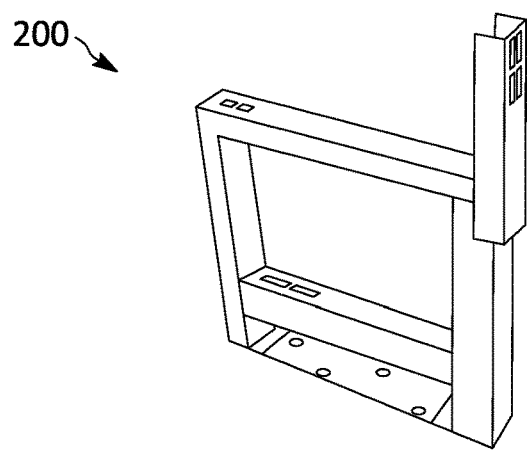
FIGS. 9A-9C show different braces for the repair of damaged portions on systems as shown at FIGS. 1-4 according to an embodiment of the present disclosure.
Figure 9B:
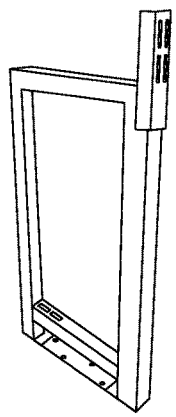
Figure 9C:
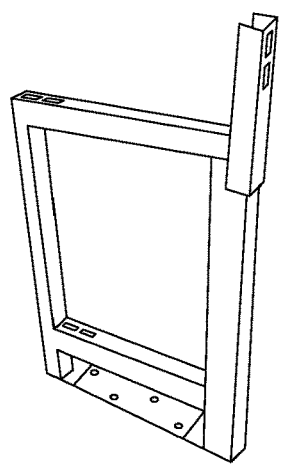

Shown at FIGS. 9A-C are embodiments of a first repair brace 200. It is shown in place at FIG. 10 and in isometric angle at FIG. 11. As explained above, the inventor understands that each industry is different and that while, to lower costs, often certain key or favorite configurations of PRS 1 are sold, over time, the solutions tend to diversify and become more unique. This, in turn increases the problems linked with maintenance, repair and re-certification after repair. The inventor now relies on the fundamental new and non-obvious notion that current tools, such as software, hardware, or services can be improved by understanding that the process is made complex and most costly by having to match damage to a repair piece to the identical or semi identical. Today, the replacement of a damaged portion or piece of a PRS 1 requires the removing of load often from a large portion of the PRS 1, disassembling elements often stacked using bolts or slide locks above and then replacing to the identical part to a new ordered piece or semi-identical. Most often, the damaged piece cannot be partly fixed or welded in part as it is often impossible to cut a piece of a structure and maintain a load on it once welded. Said differently, it is impossible to change a shoe of a person standing on his/her own two feet or repair a tire without creating problems to the car as a whole. Today, the goal is often the replacement to the identical which can be costly because a supplier will charge for decades of storage or to manufacture a new piece on demand.

The inventor knows the benefit of repairing to identical (i.e. replace piece A with new piece A') results in a more streamlined re-certification of the system after repair. By replacing to identical, engineering principle apply to confirm that the resulting structure should have the same physical properties as the pre-repair original structure. Another problem in replacing to the identical is the need to keep a massive inventory of pieces for repair. Over time, as the systems age, a stock of old pieces must be maintained and stored and these pieces are also subject to be damaged by the passing of time.

The inventor has invented a system which is built on modularity afforded by relying on the principle that in this field, "repair to stronger" has massive advantages that, if managed carefully can offset disadvantages. If a piece for repair and use can be created, a bit like a cast is used around a broken leg, it must be made so that this piece has (a) the capacity to be adapted to many different configurations, locations and positions, and (b) this piece(s) exhibit much stronger resistance attributes once in place. The repair process might be enhanced, simplified, streamlined and improved by using such a "brace." In addition, this stronger piece can be certified to cover many angles, many locations and more importantly be able to adapt to most configurations sold and in need of repair.

The inventor has also created an invention that relies upon the notion that often the same location or damage point, in any system is vulnerable. Often, that location sees a great level of vehicle traffic, many lift trucks and is at a location with low visibility for drivers. Such "locations" when repaired to the identical often results in costly changes that must simply be repeated later on duplicating costs. By simply repairing a weak point or a segment/location to stronger, the structure is greatly strengthened any helps protect further damage. The inventor has discovered that in these systems, 2D braced can be created (e.g. X-Y, Z-Y, or X-Z) which are made stronger by taking a single piece (e.g. X, Y, or Z) and by reinforcing it in size but also pairing it mechanically with a second piece in a perpendicular orientation, the resulting brace are strong and customized portions that can be adapted to repair and replace locally damaged portions.

Figure 10:
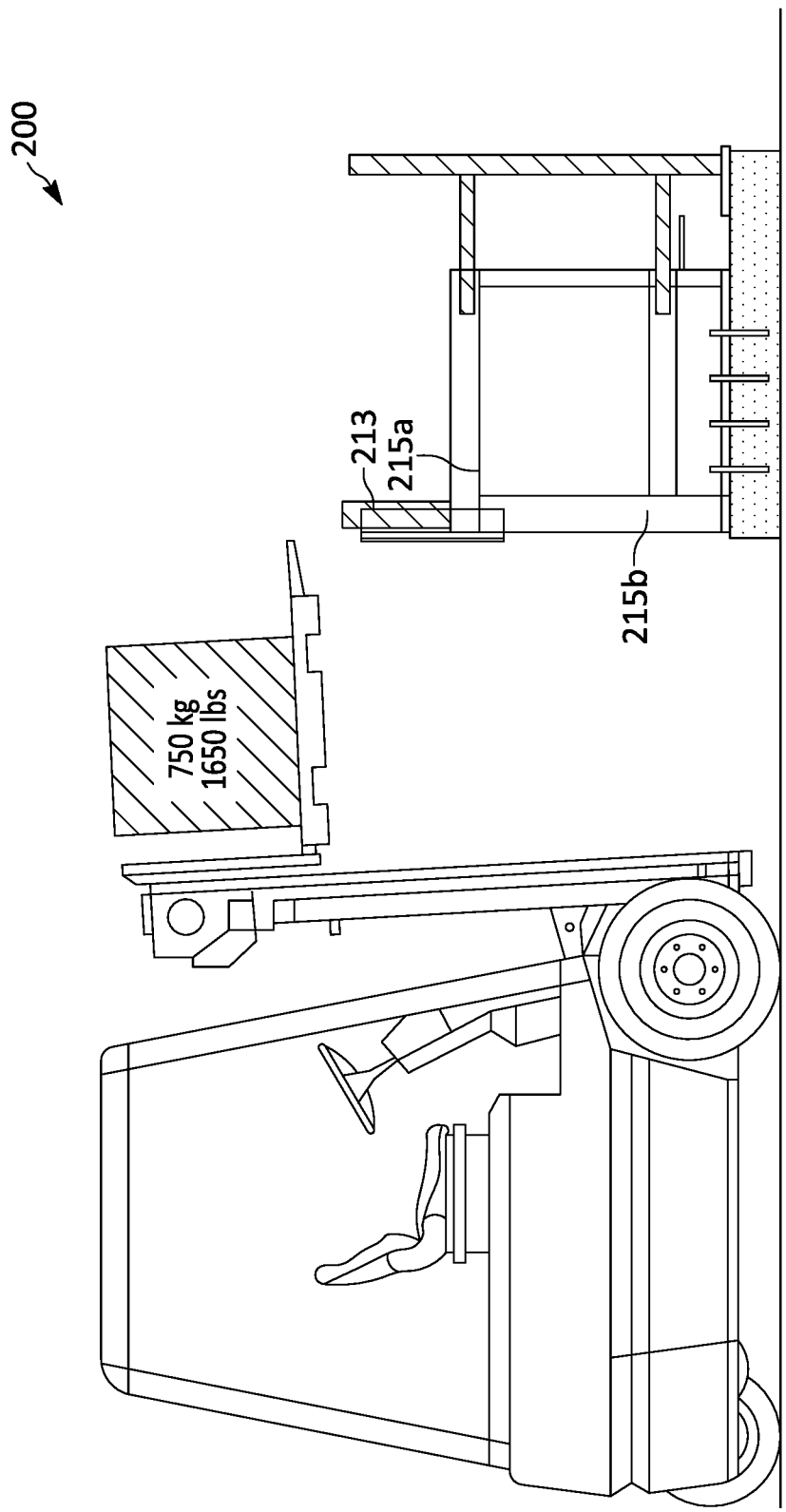
FIG. 10 shows a side view of a brace put in place for loading and repair of a rack according to an embodiment of the present disclosure.
Figure 11:
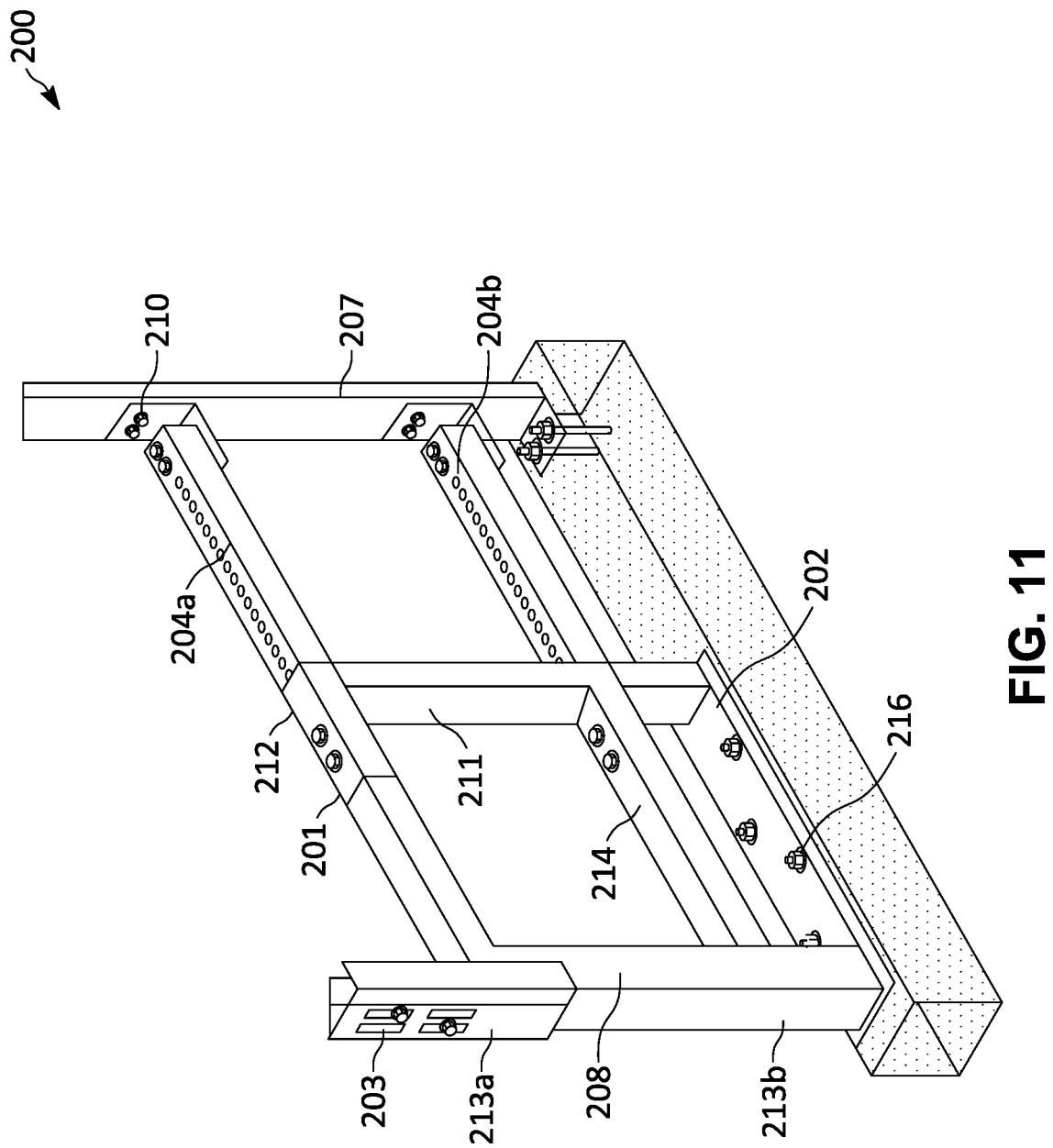
FIG. 11 illustrates the brace and extension system for the repair of a system as shown at FIG. 1-4 according to an embodiment of the present disclosure.

FIG. 10 shows generally one type of brace 200 created and invented by the inventor as seen from the side once installed. At FIG. 11, what is shown is a brace 200 standing up in Z-Y axis. The inventor designed this brace 200, for example to fix damage of an Upright along the Z axis. At FIG. 11, the brace 200 is shown in perspective. Talking about the brace 200, this vertical structure is in the form of a reinforced square 201 and as such has enhanced mechanical resistance. The square closes the structure by added a second vertical load bearing piece 211 may be designed to take on the weight of any pallet or load placed on top as shown at FIG. 10. Piece 211 may also not take a vertical load from a pallet but instead be a base structure within the repaired frame that allows connection to the existing rear post 207 by means of the adjustable struts 204a and 204b. The load from above can be transferred through post 208 and the original column 207 with the complete structure 200 providing the rigidity to allow for the original capacity or greater. This may or not create a load area 212 for a pallet and allows for connectors not to have weight/resistance requirements 204a, 204b as loads may still be supported on the original beam structure. The brace 200, as shown at FIG. 11 can be reinforced with a floor plate 202 and bolts, a side plate 203 also with bolts, and can be designed with extensions arms 204a, 204b, simply to connect the reinforced piece 201 to the existing structure 207 as shown by the back post which is original. In one embodiment as shown, the horizon connector extensions 204a, 204b can be simply connected into place at a selected distance by bolting it in place 210 to the square 201 and then to the existing structure 207. FIGS. 9A, 9B, and 9C illustrate the brace 200 but in a slightly different shape where the square having appropriate dimension to adapt to structures.

While one type of brace 200 is shown at FIGS. 9-13, one of ordinary skill in the art will understand that such braces can be created for any type of repair in any type of configuration as part of the systems shown at FIGS. 1-4. In the event the damage is found on a horizontal piece, in front of a bay, the brace designed can be a flat horizontal 2D piece which is designed to replace corners and struts using similar technology. The attachment in place as shown can be bolted, welded, or even slipped into place using one of numerous attachment methods known.

What is shown at FIGS. 9-11 is a repair brace 200 for a damaged element (not shown) in a pallet rack system (PRS) such as a system illustrated at FIGS. 1-4. The brace may have an axial portion 208, such as a square or rectangular, to be placed below axially below the remaining portion of an upright 213 as shown at FIG. 10. This piece 208 has a first end 213a and a second end 213b in opposition therefrom along element 208 for structural replacement of a damaged piece (cut out and missing at FIG. 10) of an PRS along an axis, here vertical Z. As shown, the size of the element 208 can be as shown larger and wider and the axial portion 208 has a higher mechanical resistance than the damaged element. The element 208 can also not typically be wider than the original 207 member from the front (aisle side). Also shown is a second portion 201 or even 214 mechanically connected to either the first end 213a or the second end 213b at a perpendicular orientation when compared to the axis forming an L-shaped component. As shown, both pieces 208 and either 201 and 214 are square tubes and are welded to each other to help with mechanical resistance at a welding area 215a, 215b. While welding is one means to increase resistance locally, one of ordinary skill will understand that any type of connector (e.g. bolts, slid latch, lock in place, weld, etc.) can be used. Also shown is at least one connector (e.g. 204a/210, 204b/210, 202) for connecting the L-shaped component to a portion of the PRS or the ground for securing the L-shaped component in replacement of the damaged piece at its location as shown. In addition, also shown is at least one reinforcement (204a/210, 204b/210, 202, 211) between the axial portion 208 and the second portion 201 or 214 to further reinforce the resistance of the overall L-shaped component, and wherein the at least one reinforcement (204a/210, 204b/210, 202, 211) is mechanically connected to a different portion of the PRS or to the ground as shown at FIG. 11 to further serve to reinforce the overall resistance of the repair brace 200.

As shown at FIG. 11, the at least one reinforcement is an anchor plate 202 bolted on the ground 216. One of ordinary skill in the art will recognize that while a plate 202 is shown, the element could have several shape, length, or size and be designed to connect in many ways. For example, if the brace 200 is to be used in altitude above the ground, it would then have to be secured to another portion of the structure below it and would include a clamp or other C shaped piece to secure. In an embodiment, the connector 204a/204b, 210 between the existing PRS 207 and the second portion 201 or 214 is a sliding square piece with bolt connectors. Such systems allow for adjustment of the size of the brace by having holes on the top pieces 204a/204b and the user can simply adjust the length as desired by sliding the tube 204a/204b inside of the body of the piece 201, 214 as desired.

As described above, the brace 200 as formed has a higher mechanical resistance is obtained either by using a stronger material in the axial portion 208 or other portion(s), using a thicker walled material in the axial portion 208, such as a 4 mm instead of 2 mm gage, using a reinforced profile element, in the above a square shape formed of 208, 201, 211, and 214, or including additional local mechanical reinforcements such as other pieces or bolted elements. Above, the at least one reinforcement forms a closed rectangular shape.

Often, the technology linked with the above Rack Systems 1 includes automation solutions used to help customize a solution to the unique needs of a user. Also, the services can include warehouse storage equipment design and installation services including new or used inventory, rack audit and repair, and quick ship inventory. For example, Apex® offers a RBI 3-Deep Push-Back System™, the RBI 2-Deep Push-Back System™ and a Span-track Carton Flow System™.

Because of the complexity of the varied types of Systems 1, as warehouses filled with these systems age, they also can be damaged, and one of multiple ways environmental damage and degradation can be found, be shaken by earthquakes, or even suffer permanent deformations. For example, a lift truck can run into a portion of the system or a pallet can be dropped or run into the system. Initially, what was contemplated was a simple PRO Pallet Rack Audit 100. Such system requires for an expert to be dispatched physically to the System 1 and that such person have a certification or accreditation. For example, SEIZMIC Engineering® offers such an accreditation. Such certification is often secured for (a) pallet rack design, (b) system function, (c) warehouse safety. Advantages of expert audits may also include long-term record keeping, historical data where damage has occurred and quantification via photo or other visual note, and quantification of area of greater use and damage.

Repair Audit Using Software & Brace

The inventor has recognized and diagnosed that while live, in-person audits from an expert dispatched for direct and visual inspection is the most precise and effective method of offering post-installation services and on-the-spot recertification after repair, the use of some level of automation and/or remote work in context with the use of agents working at the request of a team of centralized non-expert may streamline the process and thus reduce the cost. Because the use of a live in-person expert and a live on-site audit is time consuming and costly as it requires travel, on-site inspection, the inventor has created a system where software (on a tablet, an App, or a stand-alone system) has been created as a "Do it yourself" option that is inherently designed to offer a viable alternative to existing repair and recertification systems.

Figure 5:
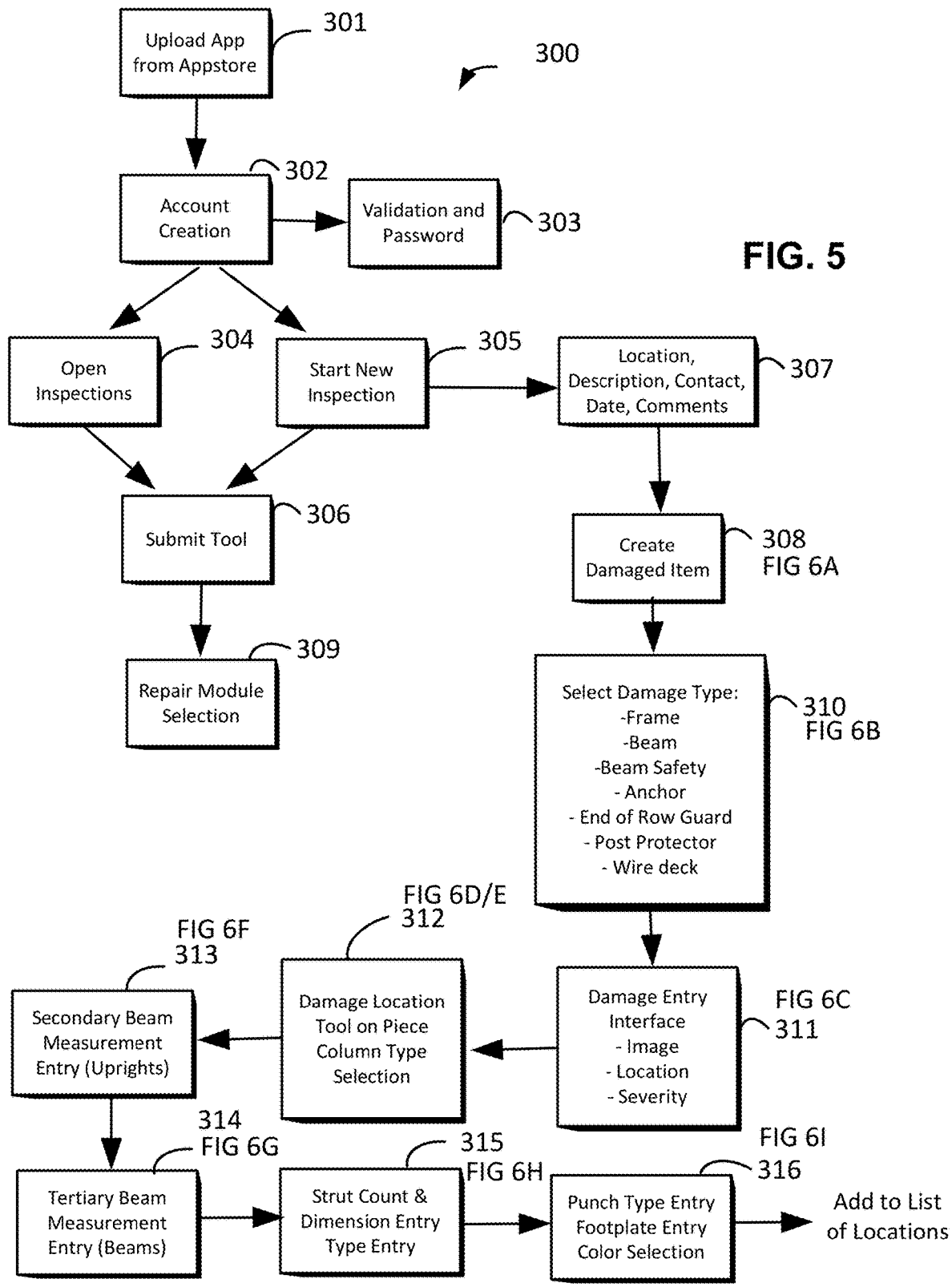
FIG. 5 is a diagram illustrating the different steps of use of a software for the quantification and reporting of points of damage on a rack system according to an embodiment of the present disclosure.
Figure 7:
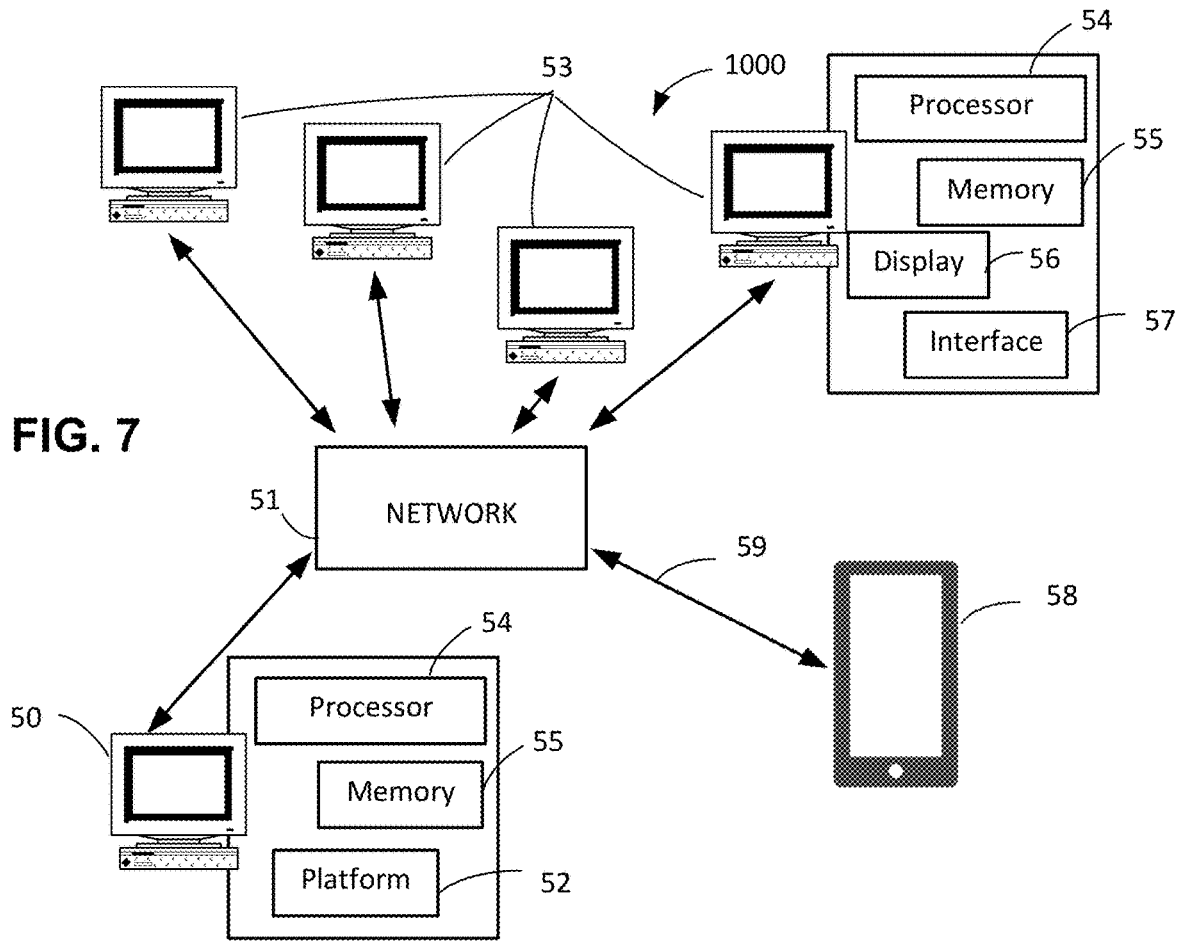
FIG. 7 is an illustration of software structures showing one typical network and computer environment for implementation of a software system or solution for the use of the software shown at FIG. 5 according to an embodiment of the present disclosure.

Turning to FIG. 7, is an illustration of a typical software structures showing a network 51 and computer environment for implementation of a software system or solution for the use of the software shown at FIG. 5 according to an embodiment of the present disclosure. FIG. 7 shows generally a spider-like system 1000 where a user (not shown) uses either a computer 58 or other device such as a phone, a web enabled phone, a pad, or any other type of computer device at the location where the PMS 1 is located to log into a server 50 via a network 51 such as the internet. The connection will be done, for example, over a network 51 such as the Internet. As shown, several computers 50, and 53 (and also 58), are designed with a processor 54, a memory 55 connected to the memory for use of a display 56 over some type of interface 57. Here, the system or platform where a software resides for operation 52 is located on a server 50 capable of operating centrally or in a cloud the software package. Also, not shown is the process of uploading from a server, either locally or remotely the software for installation locally and for operation with a website or software located on the server 50 for the processing of data.

Shown at FIG. 7 is a structure of computer network arrangement 1000. Moving to FIG. 8, this diagram illustrates one transfer system for the transfer of damage information to create a report according to an embodiment of the present disclosure. The system 1000 has software locally at 58 or 53 and locally at a central location 50 for processing of data. Using device 58 shown at FIG. 7, a person uploads an App from an App store as described at FIG. 5 and turning to the software layers shown at FIG. 8, using an HTML browser 60 or directly the App interface, via a URL 61 or some type of dynamic connection specific to the App data is connected. The system 62 described above as 50 which is a type of website/App with a main page 63 and subpages 64 to offer structured information 65 or non-structured information 66. Users navigate the website 62 via these pages 63, 64 to enter and deliver structure and non-structure data. So shown is a hardware and first layer of software generally known in the art.

Figures 6A, 6B:
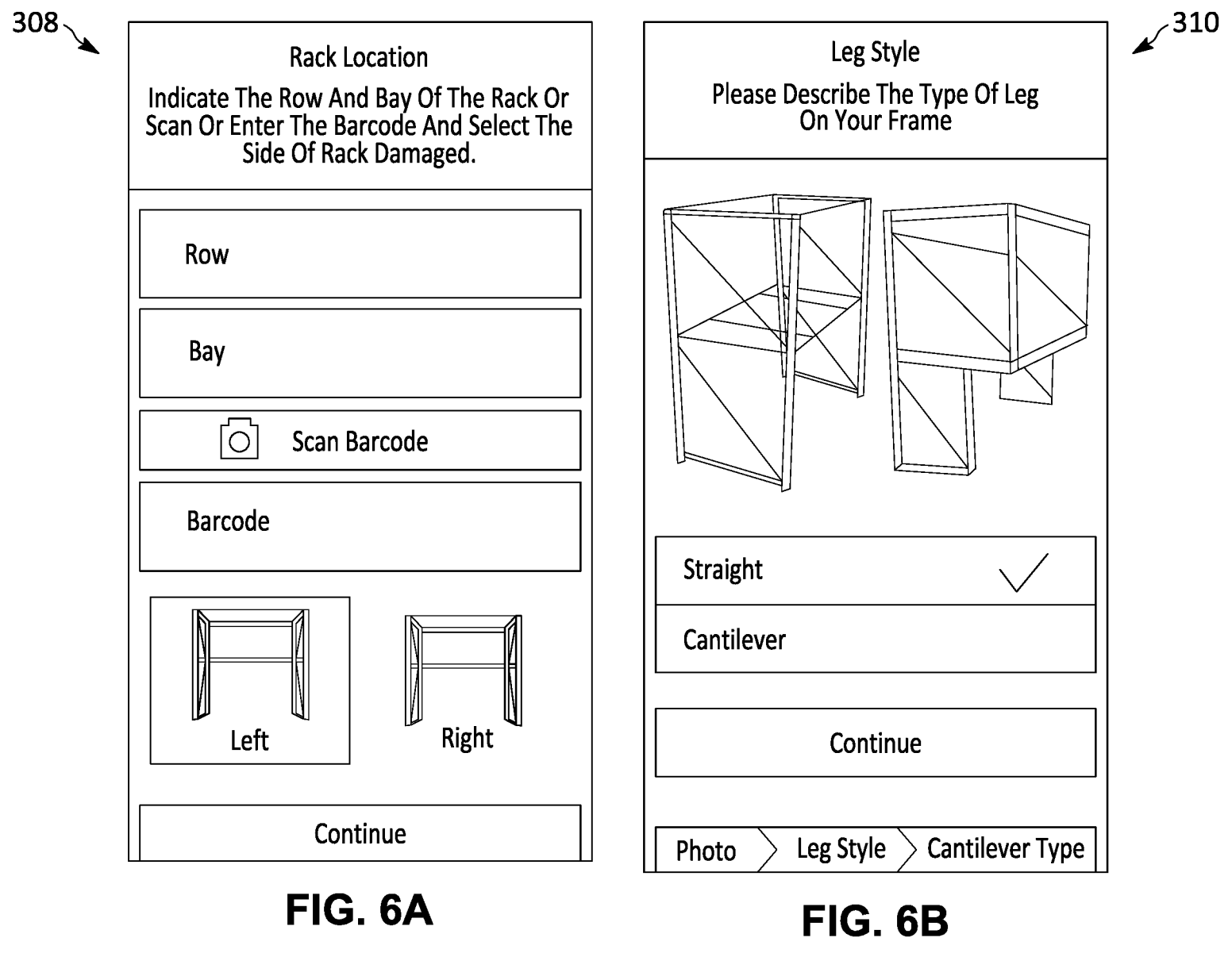
Figure 6D:
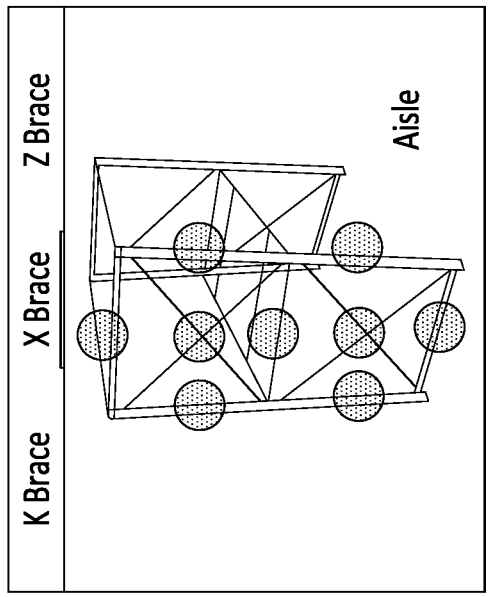
FIG. 6C-6E are sample illustrations of the software described via diagram at FIG. 5 showing tools to enter the identity and location of damages on an element according to an embodiment of the present disclosure.

Returning to the specific way the software operates at FIG. 5, is a diagram illustrating the different steps of use of a software for the quantification and reporting of points of damage on a rack system according to an embodiment of the present disclosure. Such sample pages, in the form of cell phone screen shots are shown at FIG. 6A-6I. FIG. 6A is a sample illustration of the software described via diagram at FIG. 5 showing the rack location of a piece of damage according to an embodiment of the present disclosure. FIG. 6B is a sample illustration of the software described via diagram at FIG. 5 showing the leg style entry of a piece of damage according to an embodiment of the present disclosure.

Figure 6E:
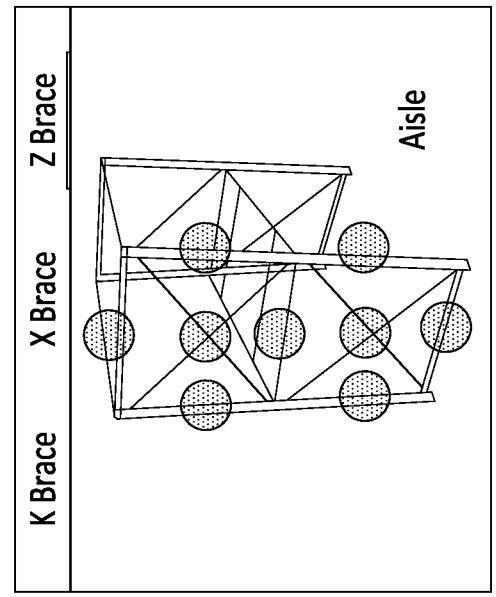
Figure 6C:
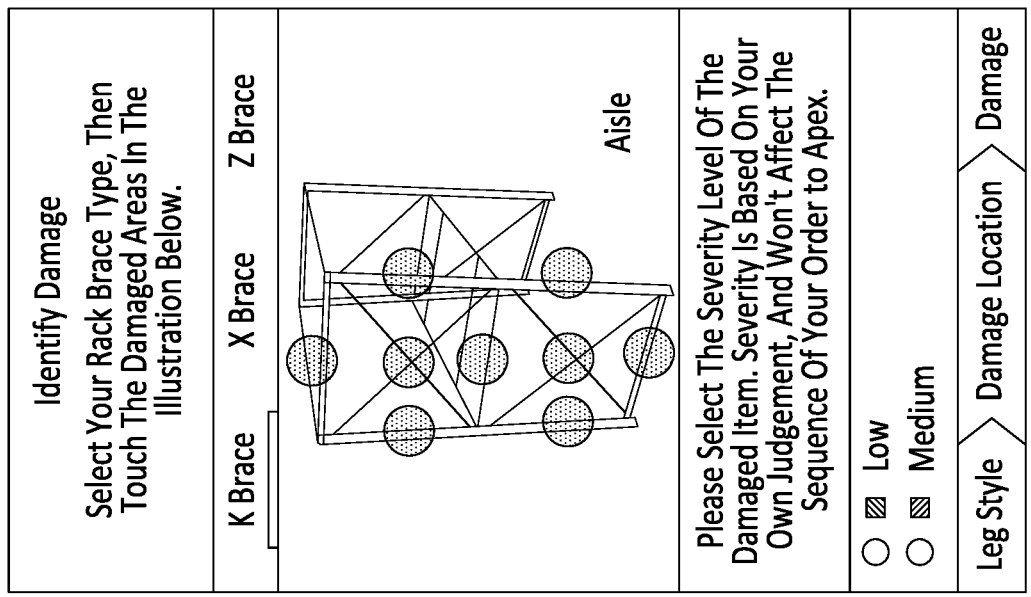
Figure 6G:
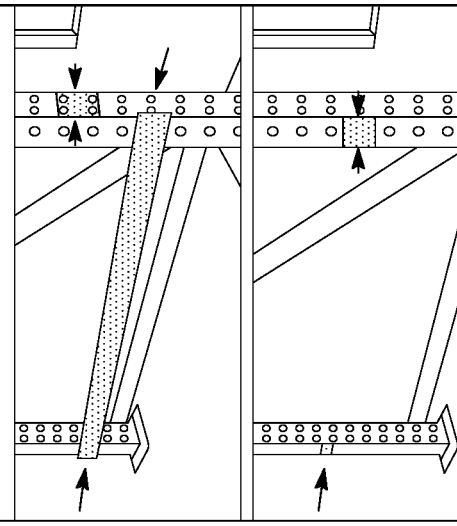
FIG. 6G is a sample illustration of the software described via diagram at FIG. 5 showing the location of uprights according to an embodiment of the present disclosure.
Figure 6F:
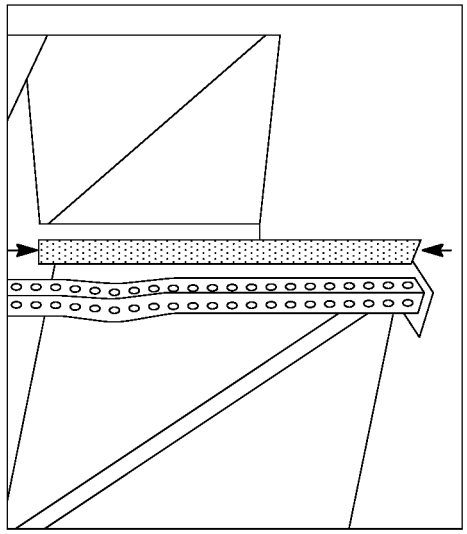
FIG. 6F is a sample illustration of the software described via diagram at FIG. 5 showing the entry of damage height of a piece of damage according to an embodiment of the present disclosure.
Figures 6H, 6I:
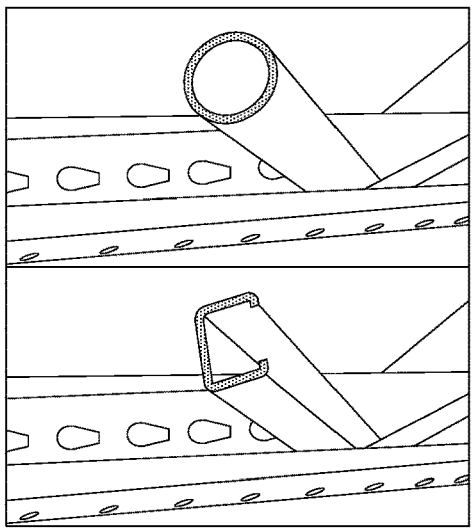

FIG. 6C-6E are sample illustrations of the software described via diagram at FIG. 5 showing tools to enter the identity and location of damages on an element according to an embodiment of the present disclosure. FIG. 6F is a sample illustration of the software described via diagram at FIG. 5 showing the entry of damage height of a piece of damage according to an embodiment of the present disclosure. FIG. 6G is a sample illustration of the software described via diagram at FIG. 5 showing the location of uprights according to an embodiment of the present disclosure. FIG. 6H-I are more sample illustration of the software described via diagram at FIG. 5 showing entry of additional data according to an embodiment of the present disclosure.

At FIG. 5, the diagram shows generally where a software to be used and uploaded from an App store 301 or uploaded in any other way or via access via a HTML internet browsing site, where a person creates an account 302 with a classic validation and password phase 303. The system 300 allows for the process and analysis of open inspections 304 or start a new inspection 305. One of ordinary skill in the art understands the distinction between open inspections 304 and start of new inspection 305 where data is entered using steps shown on FIG. 5. The App allows for the inspections 304, 305, to be submitted 306 to generate a repair module report 309 of some type in the form of proprietary information.

Figure 8:
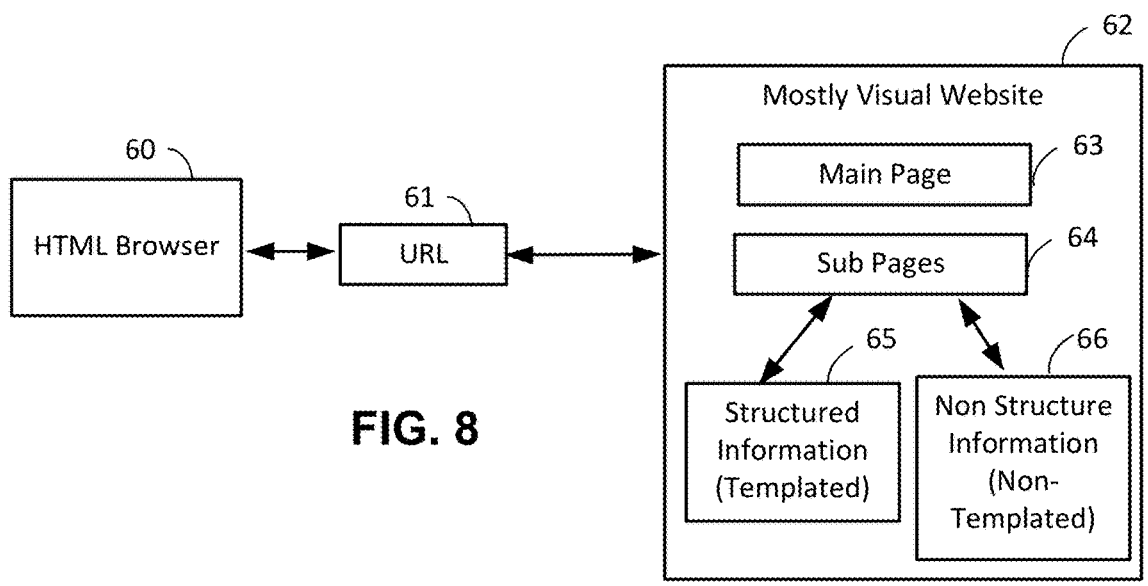
FIG. 8 illustrates one transfer system for the transfer of damage information to create a report according to an embodiment of the present disclosure.

Returning to FIG. 5, the App or software 62 playing over the device 58 as shown at FIGS. 7-8, a user, after receiving some level of training will go physically or virtually to a location 307 and enter into the system the description, a contact information, a date and comments relating to the work in place. Some of that information can be tailored to the need and branding of a corporation, for example if a large client has hundreds of storage systems, each can be entered into a database and each given a unique number for reference. Such data entry is known to one of ordinary skill in the art and is similar to the damage entry from a coroner during a medical examination on a figure of a body.

Unlike the above, such systems often cannot be mapped generally as two racks are rarely identical. A first (of possibly a series) of damaged items are created, opened and entered into the system 308 as part of a systematic walk-through performed around the structure 1. As shown more specifically at FIG. 6A a row, bay, barcode and a side (left v. right) is entered. While this information is suggested for entry, one of ordinary skill in the art will recognize that any type of information may be entered based on the need.

The information entered hereafter is linked with one entry before it is submitted 306 or stored as an opened inspection 304. Next, at FIG. 6B something like the leg styles are entered when appropriate. In the image, a straight leg (as shown at left) when compared to a cantilevered version as shown at right. The goal at this stage is to provide a simple, easy to follow interface to a user to enter the damage. Next, at FIG. 6C the damage type begins. As shown, the interface helps users an image, a location and a severity such as low, medium or severe damage.

Next at FIG. 6F, the height 313 of the damage location is entered using a simple inch data and associated illustrative imagery. More information is then entered as the measurement of uprights and other elements as shown at FIG. 6G. What is shown generally is a simple, well-built interface designed to help illustrate and guide a person into the entry of damage data to help illustrate and position the damage done at the point where pictures have been taken. FIGS. 6H and 6I next allow a person to enter the type of struts and the type of connectors.

In the above, what is generally shown is a process for the slow transfer of data into the system to document and record all of the characteristics linked with one damaged item 308. Each is sent to a list of location.

Also, the inventor explains an Upright Damage Audit includes: (a) Contact form including contact email or location from client (includes resume previous audit), (b) visual inspection, (c) find damaged area, (d) select the type of damage found on list, (e) enter damage location either via (e.1) code bar (plus verification on image) or other way to manually describe location, (f) enter in images the side of the damage on the bay, (g) create damage list by entering 3 photos—first photo shows upright (i.e. the piece) from a distance, second photo shows up-close picture, and third photo additional detail needed including at an angle to show attachment, foot place, guard, etc., (h) each damage location as a different entry, (i) in additional step a 3D image is showed with round red markers to allow indication of where the damage is located by ((i.1) select bracing type between K-Brace, X-brace, or Z-brace), (i.2) touch where it hurt on the diagram, (i.3) enter severity of damage (low, medium or critical), (i.4) enter in inches height of damage in the upright using an image (back and front), note if pinched, several measurements (start bend, end bend), (i.5) select type of beam from a chart of beams including seismic backer (two columns connected for greater strength), (i.6) enter distances (depth and width) using diagrams in the App of the back and front), (j) measure 18 inches up from the highest damaged area how many beams and struts are at or below that point, enter in app #beams and #horizontal struts, (j.2) provide beam specs, (j.3) measure from floor and beam bracket, (j.3) provide strut and frame backer detail (data is entered from floor to first horizontal strut and floor to first angled, (j.4) include seismic backers if present, (j.5) enter data, (j.6) enter column punch chart for the damaged upright, (k) measure footplates of upright, (k.1) use diagram provide measurements, (k.2) select color.

Figure 12:
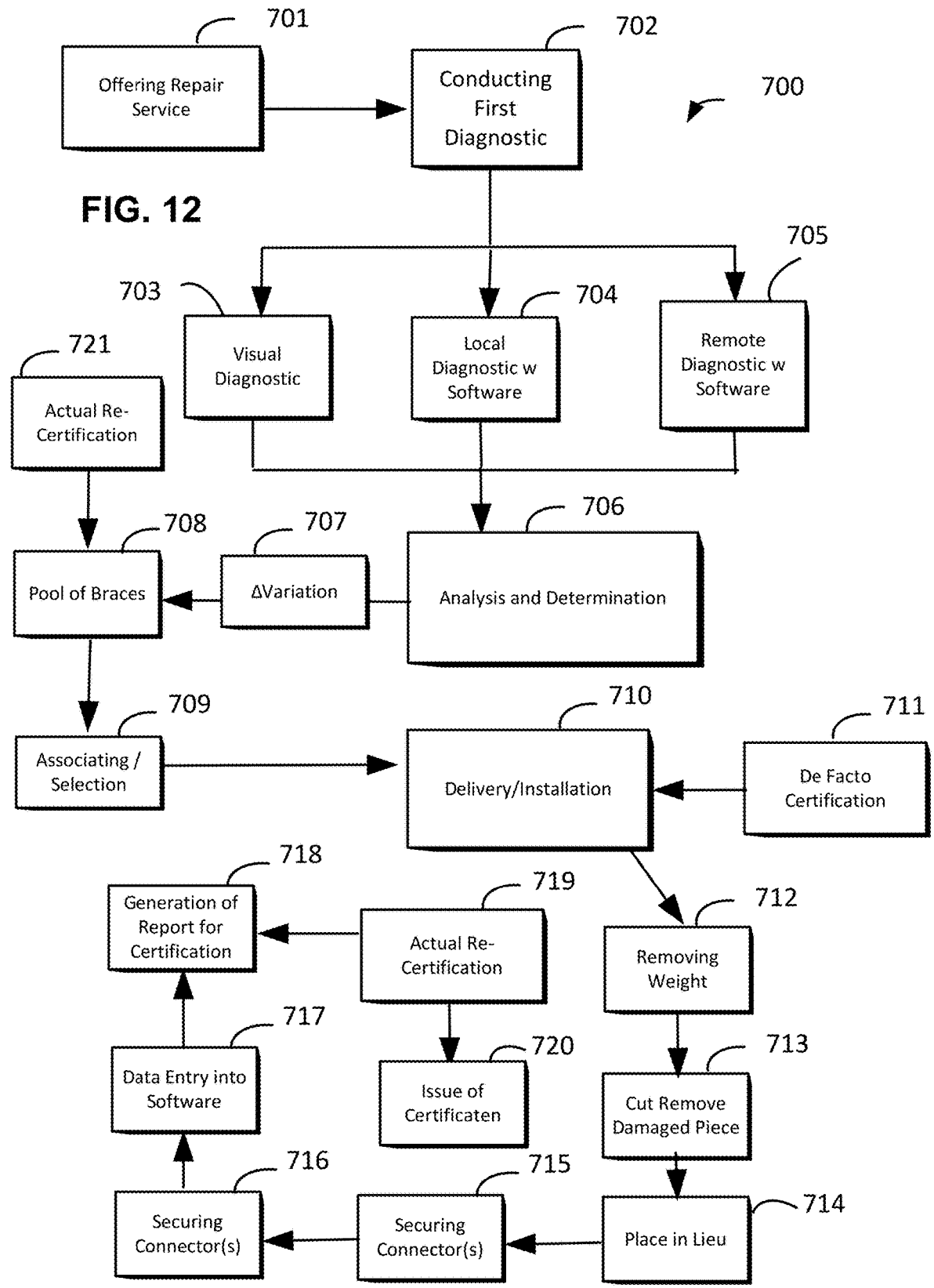
FIG. 12 is a logic-based illustration of the different steps of a method for the repair of a storage rack having at least a damaged element in a pallet rack system according to an embodiment of the present disclosure.

At FIG. 12, the inventor discloses a method 700 for the repair of a pallet rack system (PRS) having at least a damaged element as shown at FIGS. 1-4, the method comprising the steps of offering 701 to the owner of at least one PRS services linked with the repair of existing storage racks, then conducting 702 a first diagnostic of at least one damage point in the storage rack, wherein the first diagnostic is conducted either visually 703 at the PRS or remotely 705 using a tool for the recordation of the at least one damage point. As shown at FIG. 12, also a number of other options is possible such as the use of local software tools with local diagnostic, such as dispatching the person who, instead of operating normally will use a software not unlike the system shown at FIGS. 5-8. In yet another type of use, an agent can be mandated to simply act as the local eyes and ears of a person located remotely and giving instructions to the person. One of ordinary skill in the art will understand that while a handful of methods of operation of the software in tandem with users is shown, in fact multiple other methods can be imagined.

Once the steps 703, 704, 705, are performed, the data is entered and sent up as shown at FIG. 5. Data as to the points of damages is received in the system 50 as shown at FIG. 7. Next, the method includes a step of using the first diagnostic 702 received and performed as 703, 704, 705, to perform an analysis and subsequent determination 706 of an available brace for use to repair the PRS 1 at the damage point. As shown at FIG. 12, one way to conduct this analysis is first to create a map or template of variations 707 from the original specification (i.e. Location A severe, Location B mild, Location C mild, etc.) in terms of location. For each set of Location A, B, C, the system will then look first from a pool of braces able to be used to repair locations based on the severity. For example, in the above, Location A is severe and would be searched first at 708.

As shown at 709, the method next will associate the appropriate repair brace with the location. In the below table, in the pool of braces 708, each will be given a name, a type along the different axis (e.g. Z-Y as shown at FIG. 10) and then given a range of use as shown at FIG. 9A-C. In the below, the same brace A and B may be designed for different effective sizes. Next also in the below table is a list of "qualified ranges" in which using the brace selected will indeed reinforce mechanically the damaged point but also be associated with a pre-established set of qualification from a qualifying body. If the brace is used in the list of qualification-approved ranges, then the resulting PRS 1 with the brace will be pre-qualified.

| | Type/Size | Qualified Ranges |
|---|---|---|
| Brace A | Z-Y Brace/30" to 45" | List A of Qualifications |
| Brace B | Z-Y Brace/24" to 30" | List B of Qualifications |
| Brace C | X-Y Brace/30" to 36" | List C of Qualifications |
| ... | ... | ... |
| Brace N | Floor Brace/15" | List N of Qualifications |

Next, the method 700 as shown at FIG. 12 delivering and installing the repair brace to repair the at least one damage point 710. In the above, the method 700 between steps 701 to 710, the system allows for the use of a brace, with or without a software for the repair of the PRS 1 which allows for a quick and efficient change. One of ordinary skill in the art will understand that such pool of braces 708, as a whole or a set can be created with a further purpose of replacing generally all needs of certain interventions for repair and certification 711.

Also as shown, the step of installing the repair brace 710 includes the sub-steps of (a) removing weight over the damaged piece 712, (b) cutting or removing the damaged piece 713, (c) placing in the axial portion in place of the damaged piece 714, (d) securing the at least one connector 715 to the portion of the PRS for securing the L-shaped component, and (e) connecting 716 the at least one reinforcement to either a the different portion of the PRS 1 or the ground.

As described above and shown, the tool for the recordation of the at least one damage point is a standalone software tool with a set data entry tools for the indication of the damaged position in the PRS of the damaged piece, entry of at least one image illustrating the damaged position and the damaged piece, and selection and entry to a set of key parameters of the damaged piece for replacement by the repair brace.

Further, after data is entered 717 into a second portion of the software as illustrated at FIG. 8 generally, the information is sent for a report 718 as shown at FIG. 12. In one embodiment, the software report includes a first data entry portion, a selection/code linked with the brace for use as part of the repair method of FIG. 12. Once the interface is used in a subsequent step to enter and document the repair, as shown at 710 to 717, and the information is offered, a report is generated 718. At step 719, a certification authority looking at the report 718 is able to match and auto-certify and re-certify relying on the report information by default. In one embodiment, the step of analysis and subsequent determination 706 of an available brace is performed by a Certification Authority. Such Authority can, in some instances issue a Certification of the repaired PRS using the repair brace. Also shown at FIG. 12 are steps 721 of Certification by a Certification Authority of the repair brace for use in a set of fixed conditions.

Figure 13:
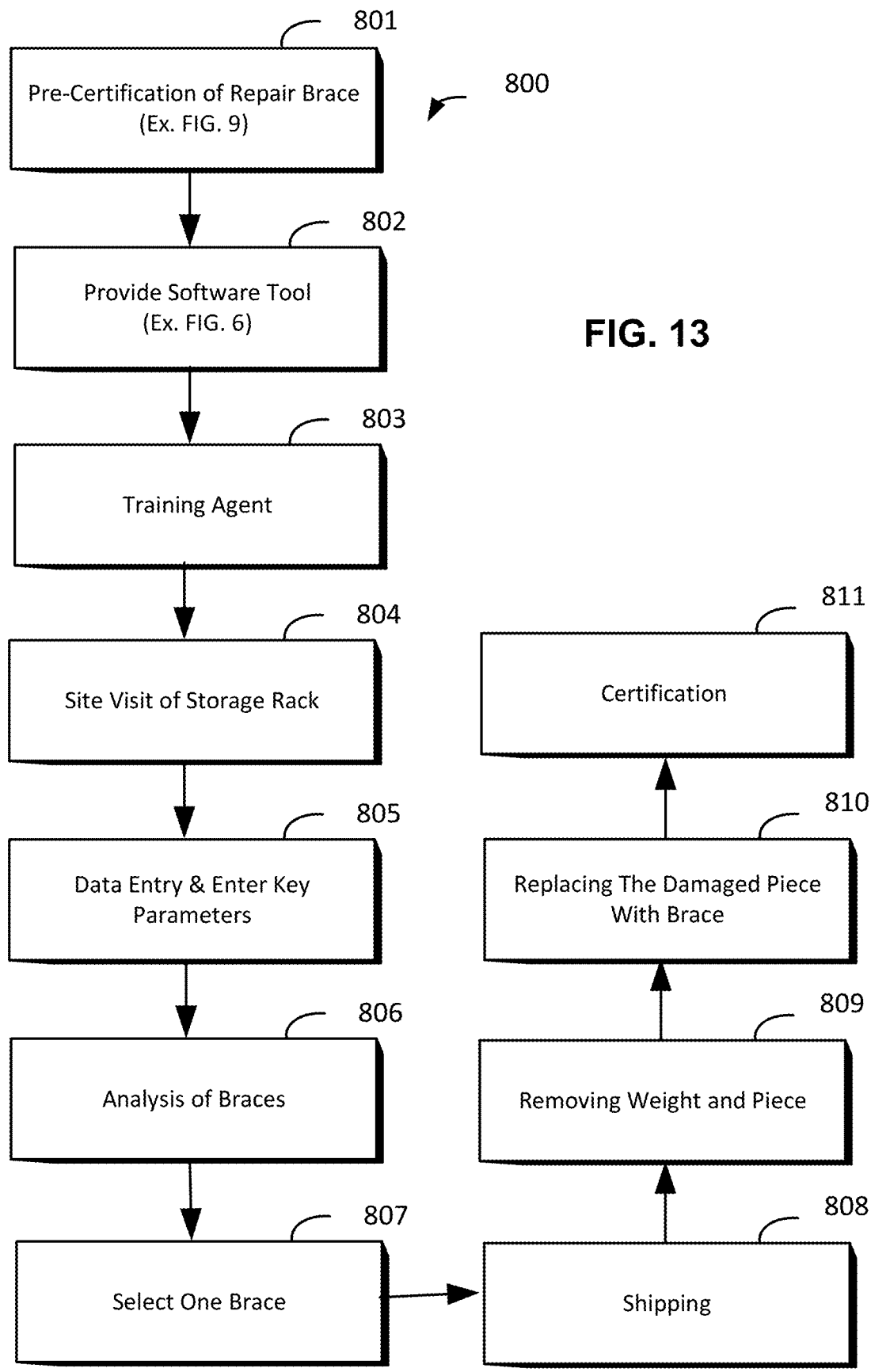
FIG. 13 is a logic-based illustration of the different components of a process for the repair of a storage rack according to an embodiment of the present disclosure.

In addition to having invented a new brace, a new digital system which incorporates the use of braces and reporting linked therewith, and a new method of use thereof, the inventor has created a new process for the repair of storage racks generally. FIG. 13 illustrates the different elements and steps of this novel process now made possible by the use of braces and associated software.

Relying mostly on the above described apparatus, methods and systems, the inventor has created a new process for the repair of a storage rack illustrated at FIG. 13. It comprises, pre-certifying 801 at least one repair brace for the local repair of a damaged piece on a storage rack according for use in a narrow set of technical limitations 801. At this phase of the process 800, using an engineering firm, a brace as described above is designed with the resistance and versatility to be able to be used at one or more damaged points. By securing the pre-certification of the brace, the Authority will confirm that, under ANSI standards, if the brace is installed as intended, it will meet the design requirements imposed by the industry standards.

Next, the process 800 includes a step or stage of providing 802 to at least one agent a standalone software tool for the recordation of at least one damage portion of a damaged point in a storage rack. Next, the process includes the training 803 the at least one agent for the use of the standalone software tool and next allowing 804 the at least one agent to visit a storage rack in need of repair and using the software and record and enter 805 data linked with at least one damaged position of a damaged piece. Each of these portions of the new process 800 are explained with greater detailed above. This portion includes allowing the at least one agent to enter a set of key parameters of the damaged piece for replacement along with at least one image of the damaged piece.

Then conducting an analysis 806 for each of a plurality of different repair braces to confirm if one or more of a number of pre-certified repair braces are certified by the Certifying Authority for use to replace the damaged piece based on the set of key parameters of the damaged piece fix. Finally select 807 one of the available repair braces pre-qualified by the Certifying Authority.

Also, FIG. 13 shows the process elements of shipping 808 at least one of the selected available repair braces 808, then removing 809 weight above the damaged piece and removing the damaged piece, then replacing the damaged piece with the at least one repair brace 810 and certifying 811 the system using the App and an associated report.

What is claimed is:

1. A repair brace for a damaged element in a pallet rack system (PRS), the repair brace comprising:
   an axial portion having a first end and a second end in opposition therefrom for structural replacement of a damaged piece of an PRS along an axis, wherein the axial portion has a higher mechanical resistance than the damaged element;
   a second portion mechanically connected to either the first end or the second end at a perpendicular orientation when compared to the axis forming an L-shaped component;
   at least one adjustable connector for connecting the L-shaped component to a portion of the PRS for securing the L-shaped component in replacement of the damaged piece; and
   at least one reinforcement connected to the L-shaped component to further reinforce the resistance of the L-shaped component, wherein the at least one reinforcement is an anchor plate bolted on the ground.

2. The repair brace of claim 1, wherein the at least one adjustable connector is a sliding piece with bolt connectors.

3. The repair brace of claim 2, wherein the at least one reinforcement forms a closed rectangular shaped cross-section.

4. The repair brace of claim 3, wherein the at least one reinforcement further includes a second sliding piece with bolt connectors.

5. The repair brace of claim 2, wherein the at least one adjustable connector comprises closed square sliding pieces.

6. The repair brace claim 1, wherein the higher mechanical resistance is obtained either by using a stronger material in the axial portion, using a thicker walled material in the axial portion, using a reinforced profile element, or including additional local mechanical reinforcements.

7. The repair brace of claim 1, wherein the at least one adjustable connector comprises an adjustable strut and a connector bracket, the adjustable strut configured to slide inside the second portion and move in a direction generally perpendicular to the axial portion to adjust a depth of the repair brace.

8. The repair brace of claim 7, wherein the connector bracket is connected to an end of the adjustable strut opposite to the axial portion, the connector bracket including at least one elongated opening configured to connect the at least one adjustable connector to a portion of the PRS.

9. The repair brace of claim 7, wherein the connector bracket is configured to connect to a vertical member of the PRS that does not need repair.

10. The repair brace of claim 1, wherein the at least one adjustable connector comprises a plurality of openings configured to releasably secure the at least one adjustable connector in a desired position relative to the second portion.

11. The repair brace of claim 1, wherein the at least one adjustable connector comprises an adjustable strut and a connector brace, the adjustable strut comprising a plurality of openings configured to releasably secure the adjustable strut in a desired position relative to the second portion and to releasably secure the connector brace to the adjustable strut.

12. The repair brace of claim 1, wherein the damaged piece comprises a sloped support of the PRS.

13. A repair brace for use in repairing a damaged pallet rack system (PRS), the repair brace comprising:
   a first axial portion comprising a vertical support member and a plate, wherein the plate is configured to secure to a damaged element of the PRS to align the first axial portion with the damaged element of the PRS;
   a second axial portion spaced apart from the first axial portion;
   a first piece oriented generally horizontally and connected between the first axial portion and the second axial portion;
   a second piece oriented generally horizontally and vertically spaced apart from the first piece, the second piece connected between the first axial portion and the second axial portion;
   a first connector slidably positioned inside the first piece; and
   a second connector slidably positioned inside the second piece;
   wherein an overall depth of the repair brace can be adjusted to a desired size by moving the first connector and the second connector relative to the first piece, respectively.

14. The repair brace of claim 13, further comprising an anchor plate connected to an end of the first axial portion opposite to the plate, the anchor plate configured to secure the repair to a ground surface.

15. The repair brace of claim 13, wherein the plate has a C-shaped cross section configured to be positioned around the damaged element of the PRS.

16. The repair brace of claim 13, wherein each of the first connector and the second connector comprises an adjustable strut and a connector bracket, the adjustable strut configured to move in a direction generally perpendicular to the first axial portion to adjust the depth of the repair brace.

17. The repair brace of claim 16, wherein the connector bracket is connected to an end of the adjustable strut opposite to the first axial portion, the connector bracket including at least one elongated opening configured to connect the connector bracket to a vertical member of the PRS.

18. The repair brace of claim 16, wherein the connector bracket is configured to connect to a vertical member of the PRS that does not need repair.

19. The repair brace of claim 13, wherein the first connector comprises a plurality of openings configured to releasably secure the first connector in a desired position relative to the first piece.

20. The repair brace of claim 13, wherein the first connector comprises an adjustable strut and a connector brace, the adjustable strut comprising a plurality of openings configured to releasably secure the adjustable strut in a desired position relative to the first piece and to releasably secure the connector brace to the adjustable strut.

* * * * *